Sept. 3, 1963 G. L. WAGNER 3,102,747
TYING MECHANISM
Filed Aug. 17, 1962 2 Sheets-Sheet 1
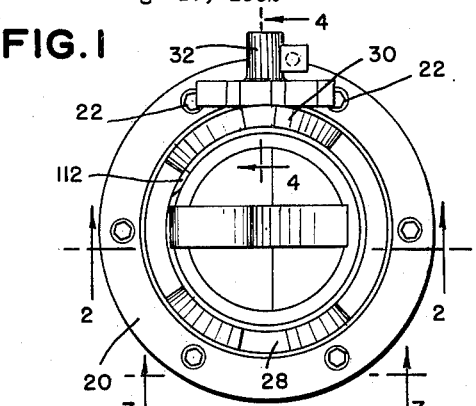
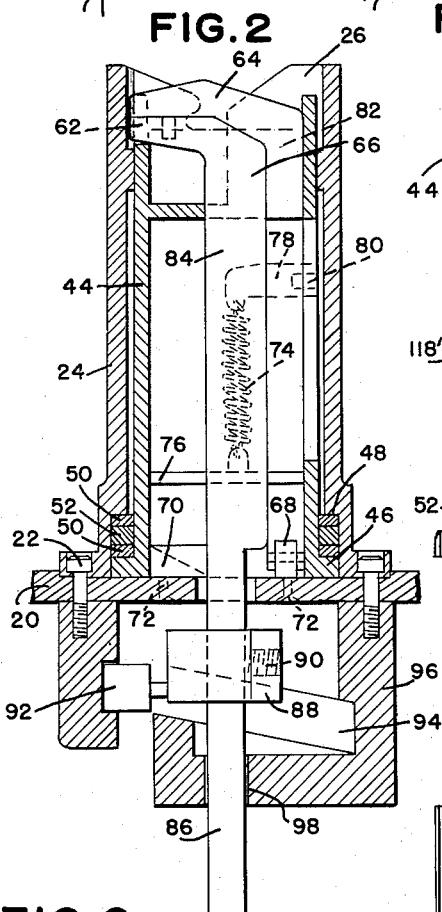
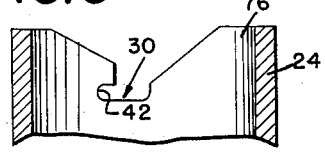
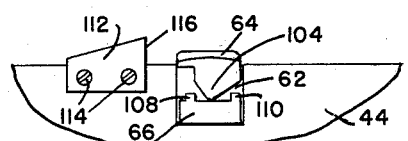
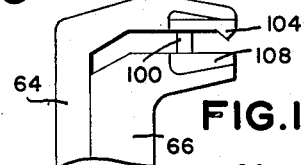
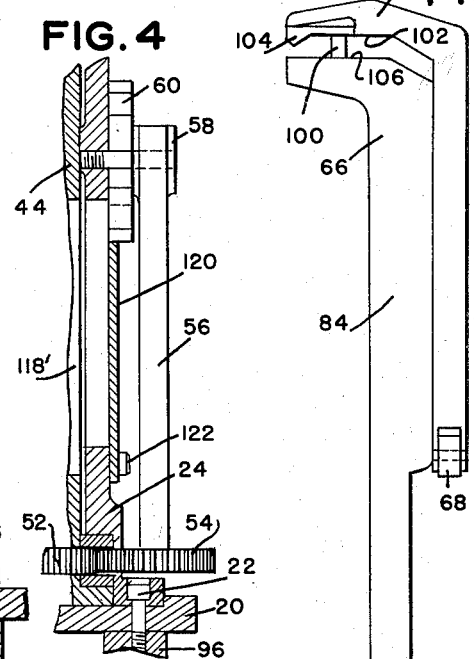
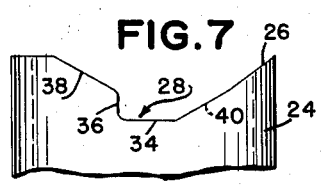
INVENTOR
GEORGE L. WAGNER
BY Raymond W. Cotten
ATTORNEY Sept. 3, 1963 G. L. WAGNER 3,102,747
TYING MECHANISM
Filed Aug. 17, 1962 2 Sheets-Sheet 2

INVENTOR
GEORGE L. WAGNER
BY Raymond W. Cotten
ATTORNEY

United States Patent Office 3,102,747
Patented Sept. 3, 1963

3,102,747
TYING MECHANISM
George L. Wagner, Rte. 1, Cutler, Ohio
Filed Aug. 17, 1962, Ser. No. 217,629
12 Claims. (Cl. 289—12)

This invention relates to a tying mechanism primarily intended for agricultural balers. It seeks to overcome the deficiencies of the conventional bill hook knotters which so frequently produce bows rather than dependable knots.

The typical tying mechanism comprises a knotter having a twine holder from which twine extends to encircle a bale, a needle being involved in completing the encirclement and in returning a needle-carried portion of the twine back to the twine disk or holder. Thus, there are presented in a certain zone a pair of twine portions lying alongside each other and these portions are twisted into a bight and a portion thereof pulled through the bight to form a double overhand knot. The tying mechanism includes several components working in timed relationship so that theoretically the mechanism ties one knot for each bale and readies the twine for encircling a succeeding bale. Primarily in the case of agricultural balers, the removal of the tied knot from the bill hook involves mechanical stripping by a movable member combining a knife which cuts the twine from the twine disk so that the tied bale is complete in itself. Because of maladjustment or other reasons, the tying mechanism, being inherently relatively complicated, suffers at times from faulty operation. For example, in some instances the mechanism fails to function properly and the result is that a knot or partial knot is left on the bill hook. Consequently, subsequent operation of the mechanism is prevented and the bill hook attempts to tie succeeding knots, with the result that the twine is built up on the bill hook, causing severe damage to the parts, let alone a succession of untied bales. Specifically, one major problem occurs in the event that the twine that runs initially around the bale slips from the twine holder and thus escapes the bill hook. Consequently, the twine brought up by the needle is the only twine tied and a single rather than a double knot is formed. The single knot has a tendency to hang onto the bill hook tongue, because the conventional stripper fails to remove the single knot. The remainder of the twine is of course caught between succeeding bales and is held there by friction. As the bales move along, the twine is placed under tension and if it does not break and remove itself from the bill hook tongue, it alternatively breaks off the bill hook tongue. If any portion of the knot remains on the bill hook, it interferes with a subsequent knot and if the tying mechanism is operated for any appreciable time without discovering the defect, the succeeding knots build up on the bill hook and ultimately the entire tying mechanism may suffer.

Whereas these problems have been partially solved in accordance with the disclosure of U. S. Patent 2,926,599, dated March 1, 1960, the fact that a stripper is still required along with the bill hook, has still left much to be desired. In accordance with the present invention, the need for a bill hook and a stripper has been entirely obviated, and for the first time a mechanism has been devised which cannot produce bow knots and which avoids the principal shortcomings of devices which have been proposed previously for this purpose.

The present invention relates to a tying mechanism for tying together opposite end portions of a bundle-encircling strand including strand holder means from which a strand extends around the rear of the bundle, and needle means for carrying the strand upwardly around the front of the bundle back to the strand holder means so that a pair of strand portions lie side by side to be formed into a knot, and comprises a housing having an open end, a barrel rotatable within the housing carrying inner and outer relatively reciprocating jaws rotatable therewith, means for rotating the barrel, means for actuating the strand holder means by rotation of the barrel to secure the strands, means provided by the housing for supporting the strands across the open end of the housing, cam means for jointly advancing the jaws beyond the strands whereby rotation of the barrel positions the jaws to overlie the strands, means retracting the jaws and strands relative to the housing whereby the strands are wrapped about the jaws to form a loop during further rotation of the barrel, the cam means separating the jaws during further rotation to receive the strands therebetween and relatively closing the jaws to clamp the strands, cutter means rotatable with the jaws to sever the strands between the strand holder and jaws, and means provided by the housing to restrain movement of the strands during their engagement by the cutter means. The housing preferably provides a bearing surface for the barrel and preferably provides both axial and thrust bearing surfaces. The jaws are preferably of substantially L-shape. The means for actuating the strand holder preferably includes gearing interconnecting the barrel and the strand holder so as to effect the required movements in properly timed relationship. The open end of the housing is notched to define a shoulder preventing relative movement of the strands in one direction of rotation of the barrel and a ramp for elevating the strands during opposite rotation of the barrel and the open end of the housing is additionally notched to define a hook for restraining the strands against axial and transverse movement relative to the housing during engagement by the cutter means for a severing operation.

The jaws have proximate surfaces provided with limiting means to restrict entry of the strands between the jaws and the outer jaw is provided with a surface proximate to the inner jaw provided with an enlargement adjacent its end to impede movement of the severed ends after the cutting operation so that as the knotted portion is removed from the jaws the severed ends will be the last to be withdrawn. The cam means includes a follower carried by each of the jaws, and a separate cam is provided for cooperation with each of these followers. The retracting means includes one or more springs interconnecting the outer jaw and the barrel.

The mechanism is constructed to facilitate access to all of its parts so that adjustment and maintenance are relatively simple, particularly in view of the fewer parts required as compared with conventional knotters. The cams are fixed with respect to the housing and require no adjustment whatsoever. The knife carried by the barrel can be readily removed and replaced since it is secured in position by screws which are readily accessible. Although substantially all of the working parts of the mechanism are enclosed so as to protect them from dust and chaff, access openings have been provided to facilitate such maintenance as may be required.

A more complete understanding of the invention will follow from a description of the accompanying drawings wherein:

FIG. 1 is an end elevation of a knotter in accordance with the present invention as it would appear to an observer looking from the front of the baler incorporating the mechanism along a line inclined to the horizontal;

FIG. 2 is a sectional elevation taken along line 2—2 of FIG. 1;

FIG. 3 is a fragmentary elevation depicting the clamping ends of the jaws and the knife in their relative locations with respect to the barrel of the mechanism;

FIG. 4 is a fragmentary sectional elevation taken along line 4—4 of FIG. 1;

FIG. 5 is an elevation of the jaws removed from the assembly;

FIG. 6 is a sectional elevation of the housing as it would be seen along line 2—2 of FIG. 1 if the remaining structure were removed;

FIG. 7 is an elevation of the upper end of the housing looking from line 7—7 of FIG. 1;

FIG. 15 is a fragmentary elevation of the jaws as seen from the side opposite to that depicted in FIG. 5.

Figure 11:
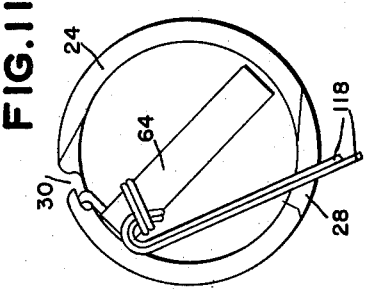
FIGS. 8, 9, 10, 11 and 12 are diagrammatic representations to show the relative positions of the parts assumed in the knotting operation.

Referring to the drawings there is shown a mounting plate 20 to which the knotter construction is secured by means of bolts 22. As will be clear to those skilled in the art, there are ordinarily two such mounting plates and two such knotter mechanisms incorporated in a single agricultural baler. Only one such knotter has been depicted for purposes of the present description since it is contemplated that the second knotter will be identical with the first.

A housing 24 is secured to the forward face of the mounting plate and at its open end 26 is provided with a lower notch 28 and an upper notch 30 for cooperation with the two strands of twine that are secured by the strand holder 32 of conventional form suitably secured to the housing 24. The lower notch 28 includes a lower edge 34, intersecting a substantially perpendicular edge 36 to define a sharp shoulder, which in turn intersects an inclined ramp portion 38 which extends to the outermost edge of the housing. The other end of the lower edge 34 intersects an inclined ramp portion 40 which extends to the outermost edge of the housing. Thus it will be evident that the housing will restrain movement of the strands from right to left as viewed in FIG. 7 yet permit their movement up the ramp 40 when they tend to move in that direction.

The upper notch 30 depicted in FIG. 6 assumes the form of a bayonet slot providing a recess 42 in which the strands will be received and rendered relatively immovable axially in both directions and transversely in one direction when the knife engages them to perform the severing operation.

Concentrically mounted for rotation within the housing is a barrel 44, having at its lower end as depicted in FIG. 2, a flange 46 which rides on the mounting plate 20 and between the flange 46 and a shoulder 48 formed internally of the housing are interposed a pair of thrust washers 50 and an annular gear 52. The gear 52 will be suitably secured to the barrel 44 for driving engagement with a pinion 54 secured to a shaft 56 which in turn actuates the conventional strand holder 32. The shaft 56 is provided with a suitable clutch, not shown, so as to drive a worm 58 in one direction only during clockwise movement of the barrel 44 as viewed in FIG. 1. Movement of the worm 58 during this period drives a wheel 60 for clamping the strands which are fed to the strand holder once during each knotting operation.

The end of the barrel 44 contains a squared notch 62 for the reception of the outer ends of an outer jaw 64 and an inner jaw 66 which are rotatably carried by the barrel but capable of axial movement with respect to the barrel and with respect to one another. The inner end of the outer jaw 64 carries a cam follower 68 for cooperation with a cam 70 secured to the mounting plate 20 by means of screws 72. The outer jaw 64 is biased inwardly at all times by means of a pair of springs 74 each having an end fastened to a plate 76 carried by the barrel 44 and an end fastened to a clamping bar 78 suitably secured by a set screw 80 to the leg of the L-shaped outer jaw 64 so as to be adjustable with respect thereto. The plate 76 is slotted so as to serve as a guide for the jaws 64 and 66, and similarly, near the outer end of the barrel 44 there is provided a relatively heavy web 82 containing a slot which also serves to guide the jaws during their reciprocating movement relative to the barrel.

The inner jaw 66 is also L-shaped and its leg 84 is terminated to define a shaft 86 which is appropriately coupled to a driving mechanism carried by the agricultural baler so as to impart the rotational movements to the jaws and their barrel 44 necessary to perform the functions of the present invention. This movement as viewed with respect to FIGS. 8, 9, 10, 11 and 12 would involve a clockwise movement of approximately one-sixth of a turn from the position depicted in FIG. 8 followed by a counterclockwise movement of approximately one and one-sixth turns back to the position depicted in FIG. 8, which is of course the position viewed in FIG. 12.

Figure 12:
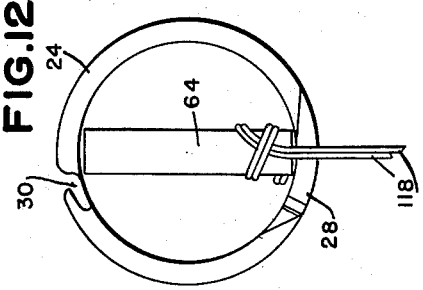
Figure 10:
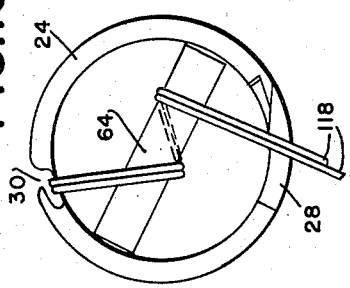
Figure 9:
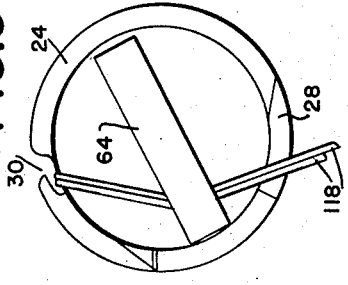
Figure 8:
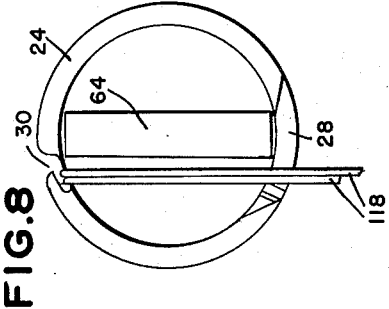
Figure 13:
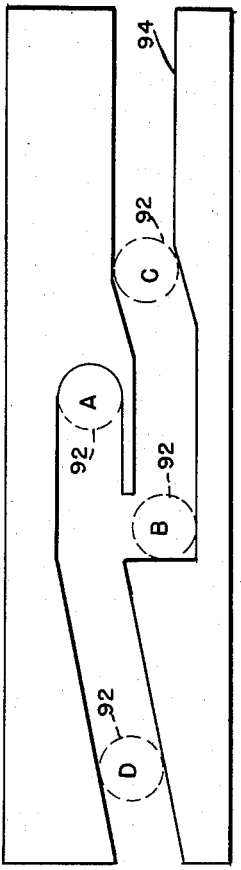
FIG. 13 is a development of the cam cooperating with the follower of the inner jaw.
Figure 14:
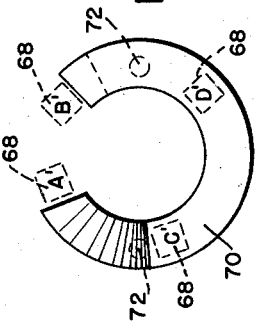
FIG. 14 is a plan view of the cam which cooperates with the follower of the outer jaw.

To an intermediate portion of the shaft 86, a collar 88 is secured by means of a set screw 90 and carries a follower 92 for cooperation with cam grooves 94 formed in a cam sleeve 96 containing an opening 98 through which the end of the shaft 86 extends for its driving engagement with its source of power. In order to facilitate an understanding of the movements of the cam followers imparted by their cams, reference can be made to FIG. 13 depicting a development of the cam grooves 94 and FIG. 14 depicting the configuration of the cam 70. FIG. 8 depicts the relative positions of the jaws and housing immediately after the needle, of a conventional type as illustrated and described by the aforesaid McClellan Patent No. 2,926,599, has fed a strand into the strand holder for clamping. With the jaws in the positions indicated by FIG. 8, the corresponding positions of the cam followers 92 and 68 are depicted in FIGS. 13 and 14 respectively, by the letters A and A'. The clockwise movement of the barrel and jaws to the extent of approximately one-sixth of a turn will move the followers 92 and 68 to the positions depicted respectively in FIGS. 13 and 14 by the letters B and B', corresponding to the position depicted in FIG. 9. The relative positions of the parts depicted in FIG. 10 correspond with the positions C and C' depicted respectively in FIGS. 13 and 14 for the followers 92 and 68. The positions of the parts immediately following the severing operation are depicted in FIG. 11, the corresponding positions of the cam followers 92 and 68 being depicted respectively in FIGS. 13 and 14 by the letters D and D'. As the counterclockwise movement of the barrel continues to its final position at the end of a cycle as depicted in FIG. 12, the cam followers 92 and 68 will again assume positions depicted in FIGS. 13 and 14 respectively by the letters A and A'.

As best depicted in FIG. 5, a guide pin 100 is secured in one of the jaws and is slidable in a complementary opening formed in the other of the jaws to maintain their alignment during relative axial movement and also prevent excessive entry of the strands of twine under operating conditions. On the surface 102 of the outer jaw 64, proximate to the inner jaw 66, and at the end of the outer jaw, there is formed a projection 104 which converges from the jaw, axially in two dimensions as will be evident from FIGS. 3 and 5. The surface 106 of the inner jaw proximate to the outer jaw, adjacent its end is formed with a pair of projections 108 and 110 defining a notch in which the projection 104 of the outer jaw is received for clamping the twine when the jaws assume their most proximate positions.

Secured at the outer edge of the barrel 44, adjacent the squared notch for reception of the jaws, a knife 112 is provided and secured in position by means of screws 114. The cutting edge 116 of the knife 112 lies adjacent to the squared notch 62 containing the jaws.

With the two strands of twine 118 positioned across the open end of the housing 24 as depicted in FIG. 8, the mechanism is in a position to begin a cycle of operation. The strands of twine are positioned in the notches 28 and 30, the follower 92 is in the position A depicted in FIG. 13 and the follower 68 is in the position A' depicted in FIG. 14. Under these circumstances, the inner jaw 66 will be projected to its greatest extent at the open end of the housing, carrying with it the outer jaw 64 so that both of them will project beyond the positions assumed by the twine strands 118. Clockwise rotary movement is now imparted to the shaft 86 to the desired degree necessary for the jaws to pass over the strands 118 to a position somewhat like that depicted in FIG. 9, whereupon the follower 92 will drop to its position B of FIG. 13 under the influence of the biasing springs 74 which will retract both of the jaws 64 and 66. During this same clockwise movement, the ring gear 52 has imparted rotational movement to the pinion 54 and its shaft 56, and through a one-way clutch, the worm 58 will effect clamping of both strands of the twine by the strand holder. As soon as the follower 68 engages the mounting plate 20 between the open ends of its cam 70, rotation of the barrel 44 is reversed to produce a counterclockwise movement of the jaws, starting at a position approximating that depicted by FIG. 9 and continuing so as to form a loop in the strands in a fashion somewhat approximating that depicted in FIG. 10. During this operation, as will be evident from FIGS. 13 and 14, both of the jaws have been projected under the influence of their cams and followers to provide sufficient amount of slack in the strands to permit the loop to be formed without breakage of the strands. The movement of the outer jaw has been greater than that of the inner jaw so that the relative positions of the jaws will be as depicted in FIG. 5, preparatory to admission of the strands between the jaws so that they can be clamped. This clamping operation is effected as the follower 92 ascends the ramp of its cam groove 94 to assume a position approximating that depicted by D and corresponding with a position just prior to that depicted in FIG. 11. It will be noted that as the jaws proceed from the positions depicted in FIG. 9 to those depicted in FIG. 10, the lower ends of the strands 118 will tend to climb the ramp 40 provided by the notch 28 so as to lie above the outermost surface of the outer jaw 64 enabling the twine to be swept over this outer surface to the position depicted in FIG. 10. It will also be noted that during this looping operation the twine will clear the knife 112. As the jaws move to a position substantially opposite the notch 30, the follower 92 moves upon the steep portion of its ramp as indicated above in order that the strands of twine can enter between the jaws. From that point on, the outer jaw will maintain its axial position while the inner jaw begins to move outwardly so that when the twine does enter between the jaws, continued movement of the inner jaw in an outward direction will clamp the twine between the jaws just prior to the time that the knife 112 engages the twine to sever it. This operation occurs just prior to the position depicted in FIG. 11. Continued rotation of the barrel and jaws in their twine-clamping positions will proceed to a position corresponding to that depicted by FIG. 12 whereupon the knot will be pulled from the jaws by the movement of the bale which has been tied. The needle will then thread a new length of twine into position and a new cycle will be initiated. Inasmuch as the follower 92 continues to climb the ramp until just before the position of FIG. 12 is assumed, the strands will be held in their clamped condition until after the knot has been removed from the jaws.

As will be clear from FIG. 4, the barrel 44 contains an opening 118' to permit access to the springs 74 and the set screw 80, and the housing contains a corresponding opening fitted with a cover plate 120 which is secured by means of suitable screws 122.

Whereas only one form of the invention has been described with reference to the accompanying drawings, variations will be suggested to those skilled in the art and such variations are within the scope of the appended claims.

I claim:

1. In a tying mechanism for tying together opposite end portions of a bundle-encircling strand including strand holder means from which a strand extends around the rear of the bundle, and needle means for carrying the strand upwardly around the front of the bundle back to the strand holder means so that a pair of strand portions lie side by side to be formed into a knot, comprising: a housing having an open end; a barrel rotatable within said housing carrying inner and outer relatively reciprocating jaws rotatable therewith; means for rotating said barrel; means for actuating said strand holder means by rotation of said barrel to secure said strands; means provided by said housing for supporting said strands across the open end of said housing; cam means for jointly advancing said jaws beyond said strands whereby rotation of said barrel positions said jaws to overlie said strands; means retracting said jaws and strands relative to said housing whereby said strands are wrapped about said jaws to form a loop during further rotation of said barrel; said cam means separating said jaws during further rotation to receive said strands therebetween and relatively closing said jaws to clamp said strands; cutter means rotatable with said jaws to sever said strands between said strand holder and jaws; and means provided by said housing to restrain movement of said strands during their engagement by said cutter means.

2. The invention defined in claim 1 wherein said housing provides a bearing surface for said barrel.

3. The invention defined in claim 1 wherein said jaws are of substantially L-shape.

4. The invention defined in claim 1 wherein said strand holder actuating means includes gearing interconnecting said barrel and strand holder.

5. The invention defined in claim 1 wherein the open end of said housing is notched to define a shoulder preventing relative movement of said strands in one direction of rotation of said barrel, and a ramp for elevating said strands during opposite rotation of said barrel.

6. The invention defined in claim 1 wherein the open end of said housing is notched to define a hook to restrain said strands against axial and transverse movement relative to said housing during engagement by said cutter means.

7. The invention defined in claim 1 wherein said jaws have proximate surfaces provided with limiting means to restrict entry of said strands between said jaws.

8. The invention defined in claim 1 wherein said outer jaw has a surface proximate to said inner jaw provided with an enlargement adjacent its end to impede movement of the severed ends of said strands during removal of said strands from said jaws.

9. The invention defined in claim 1 wherein said cam means includes a follower carried by each of said jaws.

10. The invention defined in claim 1 wherein said cam means includes a follower carried by each of said jaws, and a separate cam cooperating with each of said followers.

11. The invention defined in claim 1 wherein said retracting means includes a spring interconnecting said outer jaw and said barrel.

12. The invention defined in claim 8 wherein said enlargement is outwardly convergent.

References Cited in the file of this patent

UNITED STATES PATENTS

| | | |
|---|---|---|
| 245,667 | Shearn | Aug. 16, 1881 |
| 743,347 | Terwilleger | Nov. 3, 1903 |
| 2,513,967 | Raney | July 4, 1950 |
| 2,926,599 | McClellan | Mar. 1, 1960 |
| 2,981,559 | Furst | Apr. 25, 1961 |